United States Patent
Andre et al.

(10) Patent No.: US 10,923,708 B2
(45) Date of Patent: Feb. 16, 2021

(54) FIBER-REINFORCED SINTERED ELECTRODE

(71) Applicant: Bayerische Motoren Werke Aktiengesellschaft, Munich (DE)

(72) Inventors: Dave Andre, Munich (DE); Simon Nuernberger, Bad Aibling (DE); Jan-Oliver Roth, Erding (DE); Saskia Schneider, Munich (DE); Dennis Schuenemann, Mauern (DE); Barbara Stiaszny, Obergriesbach (DE); Christoph Stinner, Munich (DE); Nikolaos Tsiouvaras, Munich (DE); Thomas Woehrle, Munich (DE); Tobias Zeilinger, Munich (DE); Sandra Zugmann, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 183 days.

(21) Appl. No.: 16/353,593

(22) Filed: Mar. 14, 2019

(65) Prior Publication Data
US 2019/0214629 A1    Jul. 11, 2019

Related U.S. Application Data

(63) Continuation of application No. PCT/EP2017/068189, filed on Jul. 19, 2017.

(30) Foreign Application Priority Data

Sep. 15, 2016    (DE) .................. 10 2016 217 705.2

(51) Int. Cl.
H01M 4/02    (2006.01)
H01M 4/04    (2006.01)
(Continued)

(52) U.S. Cl.
CPC .......... *H01M 4/0471* (2013.01); *H01M 4/13* (2013.01); *H01M 4/134* (2013.01); *H01M 4/139* (2013.01);
(Continued)

(58) Field of Classification Search
CPC ..................................... H01M 4/02
See application file for complete search history.

(56) References Cited

U.S. PATENT DOCUMENTS

2010/0255372 A1    10/2010    Suguro et al.
2013/0189562 A1    7/2013    Dolle et al.
(Continued)

FOREIGN PATENT DOCUMENTS

DE    10 2013 219 606 A1    4/2015
EP    2 463 939 A1    6/2012
(Continued)

OTHER PUBLICATIONS

International Search Report (PCT/ISA/210) issued in PCT Application No. PCT/EP2017/068189 dated Sep. 11, 2017 with English translation (seven (7) pages).
(Continued)

Primary Examiner — Jacob B Marks
(74) Attorney, Agent, or Firm — Crowell & Moring LLP

(57) ABSTRACT

A sintered electrode having a sintered composite material is provided. The composite material contains (A) active-material particles, (B) solid-state electrolyte particles from an inorganic lithium ion conductor, (C) a particulate conductivity additive from an electrically conductive material and (D) a fibrous material, with weight proportions N(A) to N(D) of components (A) to (D) in the composite material satisfy the following: N (A)>N (B)>N (C), N (D). A solid-state lithium-ion battery containing such sintered electrode is also provided.

14 Claims, 1 Drawing Sheet

(51) Int. Cl.

| | | |
|---|---|---|
| *H01M 4/38* | (2006.01) | |
| *H01M 4/62* | (2006.01) | |
| *H01M 4/13* | (2010.01) | |
| *H01M 4/139* | (2010.01) | |
| *H01M 4/583* | (2010.01) | |
| *H01M 10/052* | (2010.01) | |
| *H01M 10/0562* | (2010.01) | |
| *H01M 4/134* | (2010.01) | |
| *H01M 4/1393* | (2010.01) | |
| *H01M 4/1395* | (2010.01) | |
| *H01M 4/1391* | (2010.01) | |
| *H01M 4/131* | (2010.01) | |
| *H01M 4/485* | (2010.01) | |
| *H01M 4/58* | (2010.01) | |
| *H01M 4/525* | (2010.01) | |

(52) U.S. Cl.
CPC .......... *H01M 4/382* (2013.01); *H01M 4/583* (2013.01); *H01M 4/62* (2013.01); *H01M 4/625* (2013.01); *H01M 10/052* (2013.01); *H01M 10/0562* (2013.01); *H01M 4/131* (2013.01); *H01M 4/1391* (2013.01); *H01M 4/1393* (2013.01); *H01M 4/1395* (2013.01); *H01M 4/386* (2013.01); *H01M 4/485* (2013.01); *H01M 4/525* (2013.01); *H01M 4/5825* (2013.01); *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2014/0154572 A1* | 6/2014 | Singh | H01M 4/622 429/215 |
| 2014/0287305 A1 | 9/2014 | Wachsman et al. | |
| 2016/0293946 A1 | 10/2016 | Ritter et al. | |

FOREIGN PATENT DOCUMENTS

| | | |
|---|---|---|
| JP | 2013-157084 A | 8/2013 |
| JP | 2015-60767 A | 3/2015 |
| JP | 2015-176854 A | 10/2015 |

OTHER PUBLICATIONS

German-language Written Opinion (PCT/ISA/237) issued in PCT Application No. PCT/EP2017/068189 dated Sep. 11, 2017 (eight (8) pages).

German-language Search Report issued in counterpart German Application No. 10 2016 217 705.2 dated May 29, 2017 with partial English translation (17 pages).

\* cited by examiner

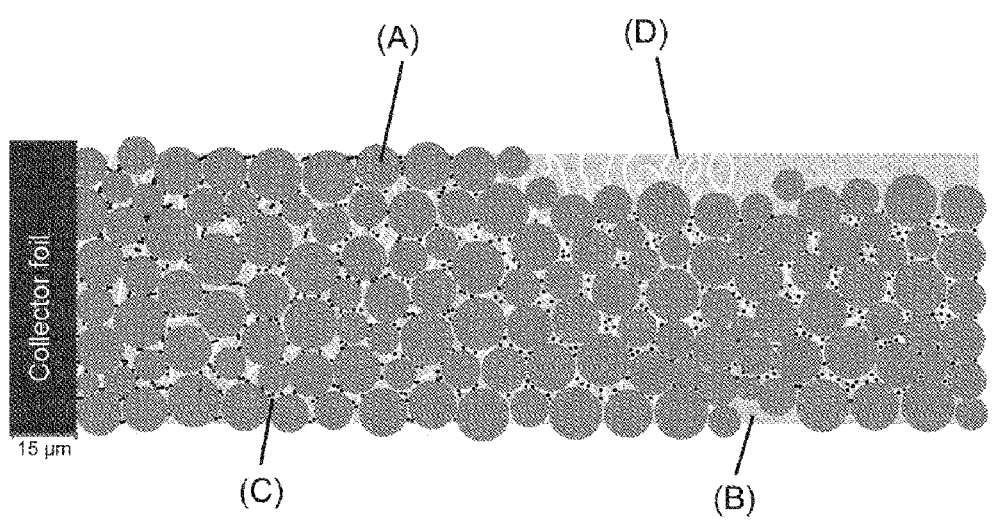

FIBER-REINFORCED SINTERED ELECTRODE

CROSS REFERENCE TO RELATED APPLICATIONS

This application is a continuation of PCT International Application No. PCT/EP2017/068189, filed Jul. 19, 2017, which claims priority under 35 U.S.C. § 119 from German Patent Application No. 10 2016 217 705.2, filed Sep. 15, 2016, the entire disclosures of which are herein expressly incorporated by reference.

BACKGROUND AND SUMMARY OF THE INVENTION

The invention relates to a fiber-reinforced sintered electrode. The invention also relates to a lithium cell having such fiber-reinforced sintered electrode.

As used herein, the terms "lithium ion battery", "rechargeable lithium ion battery" and "lithium ion secondary battery" are used synonymously. These terms also encompass the terms "lithium battery", "lithium ion accumulator" and "lithium ion cell" and all lithium or alloy batteries. Hence, the term "lithium ion battery" is used as a collective term for the aforementioned terms that are customary known in the art. In particular, as used herein, a "battery" within the scope of the present invention also includes an individual or single electrochemical cell.

Currently, mostly lithium ion batteries with liquid electrolyte are used with a negative electrode (anode), a positive electrode (cathode) and a separator placed there between, which is soaked with a non-aqueous liquid electrolyte. The anode or cathode comprises respectively an anode active material or a cathode active material, which is applied to a current collector optionally using a binder and/or an additive to improve the electrical conductivity. A polar aprotic solvent, mostly a mixture of organic carbonic acid esters in which a conductive salt, such as lithium hexafluorophosphate ($LiPF_6$), is dissolved, serves as the liquid electrolyte. The electrode structure of such a cell is generally porous so that the liquid electrolyte comes in contact with the active material particles and an exchange of lithium ions is possible. Regarding the state of the art concerning lithium ion cells, see Chapter 9, Handbuch Lithium-Ionen-Batterien [Lithium ion batteries manual], Springer Verlag (2013).

However, such cells with liquid electrolyte are subject to certain restrictions. Hence, due to the limited stability of the electrolyte, the maximum cell voltage is currently restricted to about 4.3 to 4.4 V. Irreversible reactions between electrolyte solvent and electrode or the positive and negative active material may additionally lead to a loss of capacitance with increasing number of cycles. Furthermore, the electrolyte solvents used are highly inflammable organic compounds, which in the event of an incident, for example, when overheating the cell due to an internal short circuit, is a fire hazard. Added to this is the fact that $LiPF_6$ typically used as conductive salt, may be decomposed in the event of fire to form highly toxic, corrosive species, such as HF and $POF_3$.

The use of solid electrolytes (for example, on inorganic or ceramic base) is a possibility, on the one hand to avoid these risks and on the other hand to increase still further the energy density and durability or reliability. Solid-state electrolytes are understood to mean, on the one hand glass-like or ceramic inorganic compounds which have conductivity for lithium ions. Furthermore, classic polymer electrolytes based on polyethylene oxide (PEO) are also included among the solid-state electrolytes.

Solid-state lithium ion batteries in thin-film structure with inorganic solid-state electrolyte and capacitances in the range of a few μAh to mAh are known in the state of the art and may be used, for example, for energy supply of small consuming devices, such as, smart cards or medical niche applications. Such cells are mostly single-layer and may be produced, for example, by gas-phase deposition techniques. The difficulties associated with solid-state electrolytes with regard to the limited lithium ion conductivity and boundary surface effects are thus at least partly compensated by the ultra-thin layer thicknesses. For higher capacitances, as are necessary, for example, for driving vehicles, such a structure is however impracticable. Instead electrodes having a certain minimum amount of active material content are necessary for this ("thick-layer technology") in order to provide the necessary or required nominal capacitance. Whereas for the thin-layer cells, virtually the entire active material is in direct contact both with the current collector and with the electrolyte and the effect of the layer thickness may be largely ignored, for correspondingly greater layer thicknesses, the electrical conductivity and the lithium ion conductivity becomes a relevant factor in the interior ("bulk") of the layer.

The electrical conductivity within the solid-state electrode, as also in the traditional liquid electrolyte cells with porous electrodes, can be guaranteed if required by addition of a conductivity additive, such as, conductive carbon black or conductive graphite. However, the lithium ion conductivity must be provided by the electrode structure itself in contrast to the liquid electrolyte cells.

This may be achieved by using a composite electrode from active material, solid-state electrolyte and optionally an electrically conductive additive, or an electrode binder. The solid-state electrolyte, which is present in the form of particles or in the case of polymer electrolytes or glass-like inorganic solid-state electrolytes may also form a uniform matrix, provides the lithium ion conductivity within the composite material. It thus assumes the role of the liquid electrolyte which has penetrated into the pore structure in the case of traditional cells. Such a composite material may be produced, depending on the materials used, for example, by sintering and/or pressing, and preferably has as low as possible porosity, since the presence of lattice vacancies places brings with it an impairment of the contact between active material and solid electrolyte.

In a solid-state lithium ion cell ("all-solid-state cell") with inorganic solid-state electrolyte, in particular a sintered composite material from active material, a solid-state electrolyte as lithium ion conductor and optionally an electrically conductive additive (designated below also as conductivity additive) is suitable as electrode material, as described above. The solid-state electrolyte is thus sintered firmly on the active material and assumes at least also partly an electrode binder function.

During charging and discharging, there may be changes in the volume of the active material particles due to the intercalation and de-intercalation of lithium ions. In the case of relatively hard and pore-free sintered electrodes, this leads to mechanical stresses which may lead to microscopic detachments or uncouplings of lithium ion conductor particles and particulate conductivity additive from the active material, as a result of which the service life of the cell suffers.

Furthermore, the adhesion of the electrode material to the current collector may thus also be impaired, in particular at high surface contents. A further disadvantage is the unfavorable ratio of active material to passive material. The restriction of the surface content and of the active material content lead to a limitation of the energy density.

It is an object of the invention to provide a sintered composite material electrode for all-solid-state lithium ion batteries, which has improved mechanical stability with respect to stresses and volume shifts during cyclization. The cohesion within the electrode and the adhesion to the current collector may thus be improved, which increases the service life. Furthermore, higher content and a higher ratio of active material to passive materials are thus also facilitated, which increases the energy density.

This and other objects of the invention are achieved by a sintered electrode of the present invention, and by a lithium cell or lithium ion cell, in particular a solid-state lithium cell or lithium ion cell containing this electrode.

The sintered electrode of the invention includes a sintered composite material, which contains:
(A) active material particles;
(B) solid-state electrolyte particles from an inorganic lithium ion conductor;
(C) a particulate conductivity additive from an electrically conductive material; and
(D) a fibrous material;
wherein for the weight proportions N(A) to N(D) of components (A) to (D) in the composite material, the following applies: N(A)>N(B)>N(C), N(D).

The proportion N(A) is preferably 60 to 98 wt. %, the proportion N(B) is 1 to 38 wt. %, the proportion N(C) is 0.5 to 15 wt. % and the proportion N(D) is 0.1 to 10 wt. %, based on the total weight of (A), (B), (C) and (D).

Proportions of 67.5 to 92.5 wt. % N(A), 5 to 30 wt. % N(B), 2 to 8 wt. % N(C) and 0.5 to 5 wt. % N(D) are particularly preferred, more preferably, 71 to 86 wt. % N(A), 10 to 25 wt. % N(B), 3 to 7 wt. % N(C), and 1 to 3 wt. % N(D).

With regard to efficient volume filling, it is preferable that for D(A) to D(C) and for the fiber diameter D(D) of fibers (D), the following applies: D(A)>D(B)>D(C), D(D).

In order to achieve as efficient as possible volume filling at high active material content, it is preferable that the active material particles form approximately tight packing, and the components (B), (C) and (D) fill the gaps as efficiently as possible. It is thus preferred that the volume proportion of (A) accounts for about 70 to 75 vol %.

So that the solid-state electrolyte particles fill the gaps between the active material particles more efficiently, the ratio of the volume mean diameters of (A) and (B), D(A):D(B), is preferably 2:1 or more. Furthermore, the ratio of the volume mean diameter D(B):D(C) is preferably 2:1 or more so that the conductivity additive (C) efficiently fills the gaps then still remaining. Hence, it becomes possible to provide a very compact electrode structure, the porosity of which ideally should lie close to zero. The porosity may be measured, for example, by means of mercury porosimetry and is preferably 8% or less, more preferably 4% or less, and particularly preferable at 2% or less. Due to the mechanical reinforcement by the fiber component, the electrode has high resistance to volume shifts and mechanical stresses in spite of its compactness.

In the sintered electrode of the invention, the composite material is typically applied to a current collector. Depending on the type of active material particles (A), the sintered electrode may be a positive or negative electrode. The electrode of the invention is preferably used as an electrode in a solid-state lithium ion cell (all-solid-state cell). In one possible embodiment, a sintered electrode of the invention is used both for the cathode and for the anode. Alternatively thereto, a sintered cathode of the invention may be used in combination with metallic lithium as the anode. Alternatively thereto, for example, also the use in hybrid cells having a solid-state half-cell with the electrode of the invention and a half-cell with liquid electrolyte and traditional electrode is suitable.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows the schematic structure of an electrode of the invention: (A): active material particles; (B): solid-state electrolyte; (C): conductive carbon black particles (about 80 nm), optionally in combination with conductive graphite (about 3 μm); (D): carbon nanotubes. Al foil is preferably used as the collector for a cathode, and Cu foil is used for an anode.

DETAILED DESCRIPTION OF THE DRAWING

The expressions "anode" and "negative electrode" are used synonymously in the present description, just like the expressions "cathode" and "positive electrode".

The volume mean particle diameters of the active material particles (A), of the solid-state electrolyte particles (B) and of the particulate conductivity additive (C) described below, relate respectively to the primary particle diameters. They may be determined, for example, by laser scattering, in particular according to ISO 13320.

Active Material Particles (A)

The active material of the active material particles (A) is not especially restricted, conventional cathode active materials or anode active materials may be used for lithium and lithium ion batteries.

Examples of cathode active materials which can be used are transition metal oxides with layer structure of the type $LiMO_2$ (M=Co, Ni, Mn), such as $LiCoO_2$ (LCO), $LiMnO_2$ or mixed oxides, such as $LiNi_{0.33}Mn_{0.33}Co_{0.33}O_2$ (NMC111) or $LiNi_{0.8}Co_{0.15}Al_{0.05}O_2$ (NCA), spinels, such as $LiMn_2O_4$ (LMO) or also in the olivine type crystallizing phosphates, such as $Li_xFePO_4$ (LFP) or $LiFe_{0.15}Mn_{0.85}PO_4$ (LFMP). The use of OLO (overlithiated layered oxide) or conversion active materials, such as, $FeF_3$, is likewise suitable.

Mixtures of two or more of these materials may also be used.

For example, intercalation materials based on carbon, such as synthetic graphite, natural graphite, hard carbon, soft carbon, lithium titanate materials, silicon, silicon alloys and the like, may be used as anode active material.

The volume mean particle diameter D(A) of the active material particles (A) may be, for example, 50 μm or less. Conventional values may preferably lie between 0.01 and 20 μm, more preferably between 0.1 and 10 μm.

The proportion N(A) of active material particles in the mixture (A) is not especially restricted as long as it is greater than the proportions of the other components. However, high active material proportions are preferred with regard to a high energy density. Consequently, the proportion N(A) is typically 60 to 98 wt. %, preferably 67.5 to 92.5 wt. %, more preferably 76 to 86 wt. %, relative to the total weight of components (A) to (D) of the mixture.

Solid-State Electrolyte Particles (B)

The solid-state electrolyte particles (B) comprise at least one inorganic solid-state electrolyte with conductivity for lithium ions. No special restrictions exist for the type of inorganic solid-state electrolyte, and any types known from the state of the art may be used.

An overview of suitable materials can be found, for example, in P. Knauth, Solid State Ionics 180 (2009), 911-916 or J. W. Fergus, J. Power Sources 1995 (2010), 4554-4569 (Chapter 2, "Ceramic Electrolytes"). Preferred examples are listed in EP 2 583 331 (A1), and including the compounds below or a combination thereof:

perovskites, in particular lithium lanthanide titanates (LLTO), such as,

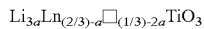

wherein $0<a\leq 0.16$ and Ln is a lanthanide or a mixture of lanthanides and □ represents a lattice vacancy;

solid-state electrolytes of the NASICON type (Sodium-(Na)-Super-Ionic Conductor), in particular having the formula:

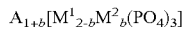

wherein A is a monovalent element, for example, Li and/or Na, $M^1$ is a tetravalent element, such as Ge, Ti, Zr or a mixture thereof; $M^2$ is a trivalent element, such as Al, Cr, Ga, Fe, Sc, In, Lu, Y, La or a mixture thereof, and $0\leq b\leq 1$; for example, $LiGe_2(PO_4)_3$ or $Li_{1.3}Al_{0.3}Ti_{1.7}(PO_4)_3$;

solid-state electrolytes of the LISICON type (Lithium-Super-Ionic Conductor) or thio-LISICON type, in particular having the formula:

$Li_{2+2c}Zn_{1-c}GeO_4$ (where $0<c<1$)

$Li_{4+d}Ge_{1-d}Ga_dS_4$ (where $0.15\leq d\leq 0.35$); or $Li_{4-e}(Ge/Si)_{1-e}P_eS_4$ (where $0.5\leq e<1$);

solid-state electrolytes of the garnet type, in particular having the formula:

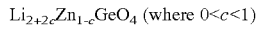

wherein $0\leq f\leq 1$ and $0\leq g\leq 0.35$; and Ln is a lanthanide or a mixture of lanthanides, preferably selected from La, Pr, Nd, Sm and Eu; $M^3$ is a divalent element or a mixture of divalent elements, preferably selected from Ba, Sr and Ca; $M^4$ is a trivalent element or a mixture of trivalent elements, preferably In; $M^5$ is a pentavalent element or a mixture of pentavalent elements, preferably selected from Ta, Nb or Sb;

composite solid-state electrolytes of at least one lithium ion-conducting compound, such as LiI and $Li_2O$ and at least one mesoporous compound, such as $Al_2O_3$ and $B_2O_3$;

oxidic amorphous lithium ion conductors, such as $LiNbO_3$ or $LiTaO_3$ or oxidic glasses having lithium ion conductivity;

sulfidic lithium ion conductors, in particular selected from the systems $Li_2S—P_2S_5$, $Ga_2S_3$ and/or $LaS_3$-doped $GeS_2$—$Li_2S$—LiI and LiI and/or $Li_4SiO_4$-doped $Li_2S$—$SiS_2$, respectively in variable mixing ratios;

lithium ion conductors of the LiPON type ("lithium phosphorus oxinitride"), such as $Li_{2.88}PO_{3.73}N_{0.14}$ or $Li_{3.0}PO_{2.0}N_{1.2}$;

lithium ion conductors of the LiSON type ("lithium sulfur oxinitride"), such as $Li_{0.29}S_{0.28}O_{0.35}N_{0.09}$;

lithium ion conductors of the LiPOS type ("lithium phosphorus oxisulfide"), such as $6LiI-4Li_3PO_4—P_2S_5$, lithium ion conductors of the LiBSO type ("lithium-borate-sulfate"), such as $(1-h)LiBO_2-hLi_2SO_4$ where $0<h<1$ (for example, h=0.7); or lithium ion conductors of the LiSIPON type ("lithium silicon phosphorus oxinitride"), such as $Li_{2.9}Si_{0.45}PO_{1.6}N_{1.3}$.

With regard to the sintered properties, oxidic solid-state electrolytes are preferred, in particular solid-state electrolytes of the garnet type, such as $Li_xLa_3M_2O_{12}$ (where M=Nb, Ta, Zr and x=15−2*[valency of M]; typically x is 5 to 7) or doped derivatives thereof, for example, $Li_6La_2BaTa_2O_{12}$, or lithium ion conductors of the LISICON type. Perovskites, such as LLTO, may be reduced by metallic lithium, and are therefore preferably suitable in connection with anode active materials with less strongly negative normal potential, such as, lithium titanate.

The volume mean particle diameter D(B) of solid-state electrolyte particles (B) typically lies in similar orders of magnitude as those of active material particles (A) and may be, for example, 50 μm or less. Conventional values may lie, preferably between 0.01 and 20 μm, more preferably between 0.1 and 10 μm.

The proportion N(B) is less than the proportion of active material particles N(A) and greater than the proportion of the remaining components, and is otherwise not especially restricted. With regard to a high active material content, as low as possible N(B) is preferred as long as the gaps between the active material particles are completely filled and good mechanical stability and lithium ion conductivity is guaranteed. Typically, the proportion lies in the range from 1 to 38 wt. %, preferably 5 to 30 wt. %, more preferably 10 to 20 wt. %, relative to the total weight of components (A) to (D) of the mixture.

Particulate Conductivity Additive (C)

Electrically conductive materials, such as carbon materials and metal powders, are suitable as particulate conductivity additive. Materials based on carbon are preferably used, for example, conductive carbon black or conductive graphite. The volume mean diameter D(C) of the particulate conductivity additive is preferably less than D(A) and D(B) and may be 30 μm or less. For example, D(C) may lie between 10 nm and 10 μm, preferably between 50 nm and 5 μm.

The proportion N(C) of the particulate conductivity additive (C) is less than the proportion N(A) and N(B) of components (A) and (B) and typically lies in the range from 0.5 to 10 wt. %, preferably 2 to 8 wt. %, more preferably 3 to 5 wt. %, relative to the total weight of components (A) to (D) of the mixture.

Mixtures of various kinds of particulate conductivity additive (C) having different diameters may also be used. In a preferred embodiment, a mixture of conductive graphite (C1) and conductive carbon black (C2) is used, wherein the diameter of the conductive graphite D(C1) is greater than that of the conductive carbon black D(C2). D(C1) may lie, for example, in the range from 0.5 to 5 μm, preferably 1 to 3 μm, whereas D(C2) lies, for example, in the range from 1 to 500 nm, preferably 10 to 100 nm. The weight ratio of C1 to C2 (C1:C2) lies, for example, in the range between 1:10 and 10:1, preferably 1:5 to 5:1, more preferably 1:2 to 2:1.

Fibrous Component (D)

Fibrous materials based on carbon may be used as fibrous component (D), preferably carbon nanotubes (CNTs). Carbon nanotubes (CNTs) are built up from at least one layer of carbon (graphene), which is rolled to form a tube. Hence, tubes with single-walled, double-walled or multi-walled structure are suitable, designated as single-wall CNTs, double-wall CNTs or multi-wall CNTs.

The mean diameter of the CNTs is less than D(A) and D(B) and typically lies in the range from 0.1 nm to 50 nm, preferably 0.5 nm to 10 nm, more preferably 1 to 5 nm. With regard to good mixability with the remaining components and good mechanical strength of the sintered material, the mean length of the CNTs preferably lies in the range from 100 nm to 100 µm, more preferably 1 to 50 µm, in particular 5 to 25 µm. Length and diameter of the CNTs may be determined, for example, by electron microscope.

Alternatively to the CNTs, other types of fibrous materials, such as glass fibers, may also be used as long as they are chemically and electrochemically stable under the operating conditions. For example, carbon fibers, which have been obtained by pyrolysis (for example, of polyacrylonitrile fibers), are also suitable. The mean diameter of the fibers is preferably less than the volume mean diameter of components (A) and (B) and is, for example, 10 µm or less, preferably 5 µm or less, more preferably 1 µm or less. The length is typically 0.01 mm to 3 mm, preferably 0.1 to 2 mm.

The content of fibrous material is less than the proportion of components (A) and (B). Higher contents are advantageous with regard to the mechanical properties of the sintered material and in the case of CNTs, also with regard to the electrical conductivity. The content N(D) of the fibrous material is typically 0.1 to 10 wt. %, preferably 0.5 to 5 wt. %, and more preferably 1-3 wt. %.

Sintered Electrode

To produce the electrode of the invention, a mixture of components (A) to (D) is produced and sintered in order to obtain a composite material. In a preferred embodiment, the particle diameters and quantitative ratios are selected so that the active material particles (A) form approximately tight sphere packing, the gaps of which are filled by the solid-state electrolyte particles (B), and the remaining gaps are in turn filled by the particulate conductivity additive (C) and the fibers (D).

Since the volume filling of a closest sphere packing is about 74 vol. %, the quantitative ratios are preferably selected so that the volume proportion of the active material (A) lies in the range of about 70-75 vol. %, and the remaining components (B), (C) and (D) account for the remaining amount and have smaller particle sizes so that they may fill the gaps.

With regard to efficient volume filling at high active material content, the ratio of the volume mean diameters of (A) and (B), D(A):D(B), is preferably 2:1 or more. Furthermore, it is preferred if the conductivity additive (C) may fill the gaps then still remaining. Therefore the ratio of the volume mean diameters D(B):D(C) is preferably 2:1 or more.

Generally, the electrode also comprises a current collector, to which the sintered powder mixture is applied. Metal foils of known type may be used as current collectors, as are used also for traditional electrodes for cells with liquid electrolyte. Generally, these metal foils have a thickness of 100 µm or less, preferably 20 µm or less, for example, in the range from 5 to 20 µm. As material, copper is typically used for the anode, and aluminum is used for the cathode.

The layer thickness of the composite material is typically 300 µm or less, for example, 50 to 200 µm.

The production method for the electrode is not especially restricted and may be selected, for example, from the following: direct sintering of a layer of the mixture and subsequent application to the current collector, optionally with pressing and use of a binder; application of the mixture to the current collector and subsequent sintering; or dispersing the mixture in a suitable solvent in order to obtain a slurry, application to a current collector and drying, subsequent sintering. Sintering may optionally be effected under increased pressure for further improvement of volume filling.

Cells

The electrode of the invention is preferably used in solid-state cells (all-solid-state cells), depending on active material, as the anode or as the cathode. In a preferred embodiment, the all-solid-state cell has both an anode of the invention and a cathode of the invention.

Alternatively thereto, an anode or a cathode of the invention may be used in conjunction with a traditional cathode or anode. In a preferred embodiment, a cathode of the invention and metallic lithium as anode are used. If metallic lithium is used, a lithium cell is also referred to. Lithium is thus used, for example, in the form of a foil which is applied to a copper foil as a current collector. Or also in the form of a lithium alloy.

Generally, a solid-state electrolyte layer, which functions at the same time as a separator, is introduced between the anode and the cathode. The same solid-state electrolyte material, which is also used in the electrode of the invention, is preferably used. The layer thickness of the separator layer is preferably thin, typically 5 to 100 µm, preferably 10 to 25 µm, with regard to the energy density and the internal resistance.

The separator layer may be applied directly to the electrode following electrode production, for example, by coating and sintering, or by gas-phase deposition methods. Alternatively, the separator layer may be produced separately, free-standing or on a carrier foil, and may be stacked with the electrodes to form electrode-separator ensembles. After stacking, pressure may optionally be applied to the ensemble of electrodes and separator.

Hybrid cells are suitable as a further alternative, in which the electrode of the invention, which is coated with a separator layer of solid-state electrolyte, forms the one half cell, and a traditional electrode with liquid electrolyte or polymer electrolyte or gel electrolyte forms the other. With regard to the limited oxidation stability of polymer electrolytes and liquid electrolytes compared to solid-state electrolytes, a cathode of the invention is thus preferably used in combination with a traditional anode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sintered electrode comprising a sintered composite material, the composite material comprising:
   (A) active material particles;
   (B) solid-state electrolyte particles from an inorganic lithium ion conductor;
   (C) a particulate conductivity additive from an electrically conductive material; and
   (D) a fibrous material;
   wherein weight proportions N(A) to N(D) of the components (A) to (D) in the composite material satisfy the following: N(A)>N(B)>N(C), N(D).

2. The sintered electrode according to claim 1, wherein the weight proportion N(A) is from 60 to 98 wt. %, the weight proportion N(B) is from 1 to 38 wt. %, the weight proportion N(C) is from 0.5 to 10 wt. % and the weight proportion N(D) is from 0.1 to 10 wt. %, based on the total weight of (A), (B), (C) and (D).

3. The sintered electrode according to claim 1, wherein volume mean diameter D(A) of the active material particles (A), measured by laser scattering according to ISO 13320, is from 0.1 to 40 µm.

4. The sintered electrode according to claim 1, wherein volume mean diameter D(B) of the solid-state electrolyte particles (B), measured by laser scattering according to ISO 13320, is from 0.1 to 20 µm.

5. The sintered electrode according to claim 1, wherein volume mean diameter D(C) of the particulate conductivity additive (C), measured by laser scattering according to ISO 13320, is from 10 nm to 10 µm.

6. The sintered electrode according to claim 1, wherein the volume mean particle diameters D(A) to D(C) of particles (A) to (C) and fiber diameter D(D) of the fibrous material (D), satisfy the following: D(A)>D(B)>D(C), D(D).

7. The sintered electrode according to claim 1, wherein a mixture of conductive graphite (C1) and conductive carbon black (C2) is used as the particulate conductivity additive (C), and wherein volume mean particle diameter D(C1) of the conductive graphite is greater than volume mean particle diameter D(C2) of the conductive carbon black.

8. The sintered electrode according to claim 1, wherein carbon nanotubes (CNTs) are used as the fibrous material (D).

9. The sintered electrode according to claim 1, wherein the solid-state electrolyte particles (B) are selected from oxidic solid-state electrolytes of the garnet type.

10. The sintered electrode according to claim 1, wherein the composite material is applied to a current collector.

11. The sintered electrode according to claim 1, wherein the active material particle (A) is a cathode active material selected from
    $LiCoO_2$ (LCO),
    $LiNi_xMn_yCo_zO_2$, where x+y+z=1,
    $LiNiCo_{0.85}Al_{0.15}O_2$ (NCA),
    spinel,
    olivine,
    overlithiated oxides (OLO) or
    conversion materials.

12. The sintered electrode according to claim 1, wherein the active material particle (A) is an anode active material selected from synthetic graphite, natural graphite, hard carbon, soft carbon, silicon, silicon alloys, lithium titanate or metallic lithium.

13. A solid-state lithium battery comprising at least one sintered electrode comprising a sintered composite material, the composite material comprises:
    (A) active material particles;
    (B) solid-state electrolyte particles from an inorganic lithium ion conductor;
    (C) a particulate conductivity additive from an electrically conductive material; and
    (D) a fibrous material;
    wherein weight proportions N(A) to N(D) of the components (A) to (D) in the composite material satisfies the following: N(A)>N(B)>N(C), N(D).

14. The solid-state lithium battery according to claim 13, further comprising:
    a positive sintered electrode, wherein the active material particle (A) is selected from
    $LiCoO_2$ (LCO),
    $LiNi_xMn_yCo_zO_2$, where x+y+z=1,
    $LiNiCo_{0.85}Al_{0.15}O_2$ (NCA),
    spinel,
    olivine,
    overlithiated oxides (OLO) or
    conversion materials;
    a negative electrode comprising metallic lithium, or a negative sintered electrode, wherein the active material particle (A) is selected from synthetic graphite, natural graphite, hard carbon, soft carbon, silicon, silicon alloys, lithium titanate or metallic lithium; and
    a solid-state electrolyte.

* * * * *